(12) United States Patent
Cornelius

(10) Patent No.: US 9,721,488 B2
(45) Date of Patent: Aug. 1, 2017

(54) DEVICE FOR RETROFITTING AUTOMOBILE WINDOW FLAG ASSEMBLIES TO SURFACES OTHER THAN AUTOMOBILE WINDOWS

(71) Applicant: Christopher Cornelius, Palm Harbor, FL (US)

(72) Inventor: Christopher Cornelius, Palm Harbor, FL (US)

(*) Notice: Subject to any disclaimer, the term of this patent is extended or adjusted under 35 U.S.C. 154(b) by 0 days.

(21) Appl. No.: 15/343,610

(22) Filed: Nov. 4, 2016

(65) Prior Publication Data

US 2017/0132959 A1    May 11, 2017

Related U.S. Application Data

(60) Provisional application No. 62/252,842, filed on Nov. 9, 2015.

(51) Int. Cl.
*A47G 29/00* (2006.01)
*G09F 17/00* (2006.01)
*F16M 13/02* (2006.01)

(52) U.S. Cl.
CPC ........... *G09F 17/00* (2013.01); *F16M 13/022* (2013.01); *G09F 2017/0075* (2013.01)

(58) Field of Classification Search
CPC ............... G09F 17/00; G09F 2017/005; G09F 2017/0058
See application file for complete search history.

(56) References Cited

U.S. PATENT DOCUMENTS

| | | | | |
|---|---|---|---|---|
| 2,546,855 A * | 3/1951 | Frame | ..................... | B60R 13/00 116/173 |
| 4,986,209 A * | 1/1991 | Spica | ..................... | B60Q 1/50 116/173 |
| 6,206,258 B1 * | 3/2001 | Calder | ..................... | B62J 11/00 224/251 |
| 6,935,268 B1 * | 8/2005 | Hawkins | ............. | H01Q 1/1228 116/173 |
| 2014/0174334 A1 * | 6/2014 | Tucker | ..................... | G09F 17/00 116/173 |

* cited by examiner

*Primary Examiner* — Amy Sterling
(74) *Attorney, Agent, or Firm* — Shumaker, Loop & Kendrick, LLP

(57) ABSTRACT

Disclosed is a mounting assembly adapted for retrofitting automobile window flags on surfaces other than automobile windows. The device includes a continuous bracket having two opposing ends that are interconnected by a flexible hinge positioned there between. The first opposing end of the continuous bracket is configured to receive and carry a slotted portion of the automobile window flag assembly and the second opposing end of the continuous bracket has a securing member formed thereon that is configured to secure the automobile window flag assembly to the device when the two opposing ends of the continuous bracket are fastened to one another.

8 Claims, 8 Drawing Sheets

DEVICE FOR RETROFITTING AUTOMOBILE WINDOW FLAG ASSEMBLIES TO SURFACES OTHER THAN AUTOMOBILE WINDOWS

CROSS REFERENCE TO RELATED APPLICATIONS

This U.S. Non-Provisional Patent Application claims priority from U.S. Provisional Patent Application No. 62/252,842 filed Nov. 9, 2015, which is incorporated herein in its entirety.

TECHNICAL FIELD

The present invention relates generally to mount assemblies for flags, and more particularly to brackets for retrofitting automobile window flag assemblies on structures other than car windows.

BACKGROUND

Over the past two decades, automobile window flags have gained immense popularity. The immense popularity of these window flags is attributed to the easy placement on and removal from car windows coupled with the versatility of easily substituting ones desired flag. For example, FIG. 1 depicts an automobile window flag assembly 10 adapted to receive an automobile window flag 20 and further adapted for placement on a car window.

As shown in FIG. 1, most conventional automobile window assemblies 10 include an elongate rod 11 having a window retention member 12 positioned on one end of the elongate rod thereby forming the assembly base. In conventional automobile window assemblies 10, the window retention member 12 (i.e., a biased slot portion or a biased hook shaped clip) is adapted to exert force against the window thereby retaining the automobile window flag assembly on an automobile window. Flag retention members 13, 14 are positioned mid-span and on an end of the elongate rod opposite of the window retention member 12 to retain the flag on the elongate rod. The flag retention members 13, 14 have a shape sufficient to secure and retain a flag on the elongate rod 11.

Although the above mentioned automobile window assemblies 10 may be utilized for displaying flags on automobiles, these assemblies have little versatility and/or use elsewhere.

SUMMARY

Therefore, a need exists to provide a device that allows automobile window flags and existing automobile window assemblies to have greater applications and utility for purposes other than being displayed from automobile windows. For example, the devices disclosed herein allow the automobile window flag assembly (and flags) to be displayed from boats, trucks, etc. Specifically disclosed is a device for retrofitting automobile window flag assemblies on surfaces other than automobile windows. The device includes a continuous bracket having two opposing ends that are interconnected by a flexible hinge positioned there between. The first opposing end of the continuous bracket is configured to receive and carry a slotted portion of the automobile window flag assembly and the second opposing end of the continuous bracket has a securing member formed thereon that is configured to secure the automobile window flag assembly to the device when the two opposing ends of the continuous bracket are fastened to one another.

In certain aspects, the two opposing ends and flexible hinge are coplanar when the two opposing ends of the continuous bracket are not fastened to one another.

In certain aspects, the two opposing ends are parallel when the two opposing ends of the continuous bracket are fastened to one another and the securing member extends over the first opposing end to secure the slotted portion of the automobile window flag assembly between the securing member and the first opposing end of the continuous bracket.

In certain aspects, the flexible hinge is configured to wrap around and be carried on a cylindrical shaped object (e.g., a rail or a pole) when the two opposing ends of the continuous bracket are fastened to one another.

In certain aspects, the first opposing end of the continuous bracket includes a first compartment formed by a free end and a plurality of side walls positioned on the first opposing end of the continuous bracket, the free end is configured to receive and carry the slotted automobile flag assembly on the first opposing end while the plurality of side walls prevent and/or reduce lateral movement of the automobile flag assembly.

In certain aspects, the second opposing end of the continuous bracket includes a second compartment formed by a plurality of sidewalls in which a first and second sidewall of the plurality of sidewalls are directly connected to the securing member and a third sidewall of the plurality of sidewalls is positioned between first and second sidewall of the plurality of sidewalls and spaced apart from the securing member.

In certain aspects, the first compartment of the first opposing end of the continuous bracket, the second compartment of the second opposing end of the continuous bracket, and the securing member form an enclosure (cavity) when the two opposing ends of the continuous bracket converge and are fastened to one another such that only clearance is present between the securing member and first opposing end of the continuous bracket to secure the slotted portion of the automobile window flag assembly between the securing member and the first opposing end of the continuous bracket.

In certain aspects, the two opposing ends of the continuous bracket are configured to fasten by a threaded engagement.

In certain aspects, the device further includes at least one fastener received through the first and second opposing ends of the continuous bracket to maintain the two opposing ends in a parallel orientation relative to one another.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

Features, aspects and advantages of the present invention are better understood when the following detailed description of the invention is read with reference to the accompanying drawings, in which.

DETAILED DESCRIPTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

FIGS. 2-9 depict the device 100 adapted for retrofitting automobile window flag assemblies 10 on surfaces other than automobile windows. For example and as further shown in FIG. 9, the disclosed device 100 may be fastened to rails (e.g., cylindrical object 200) on boats, truck beds, etc. while also having an automobile window flag assembly 10 secured thereon.

Figure 1:
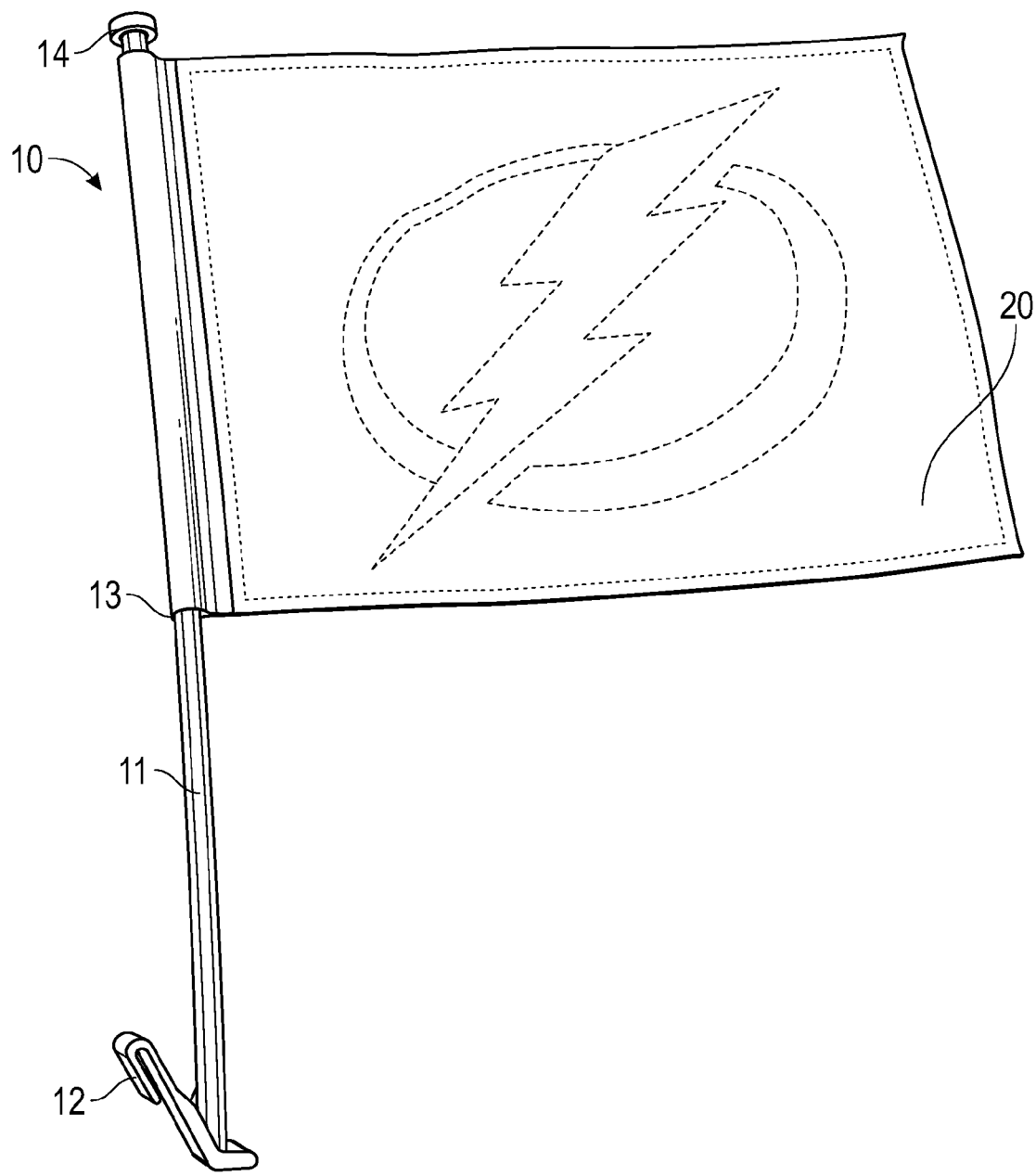
FIG. 1 depicts a conventional automobile window flag assembly with a flag attached thereon adapted for placement on an automobile window.
Figure 2:
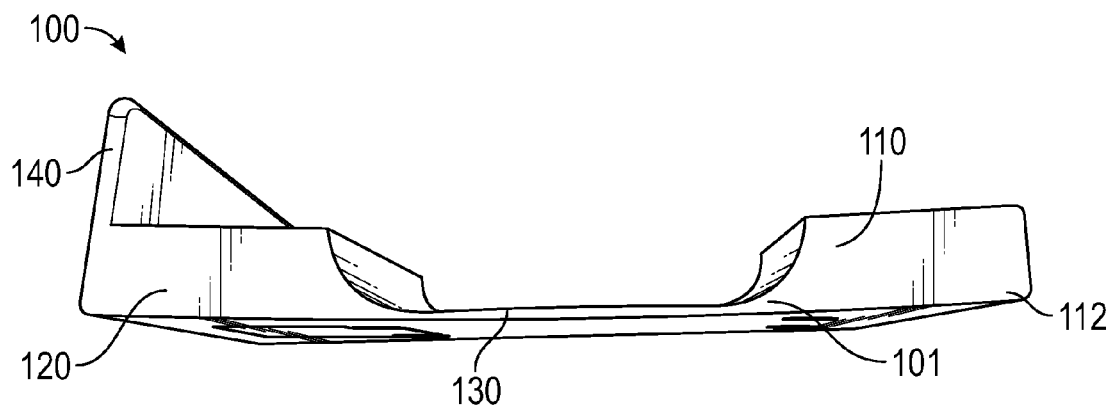
FIG. 2 is a side view of the device for retrofitting automobile window flag assemblies on surfaces other than automobile windows.
Figure 3:
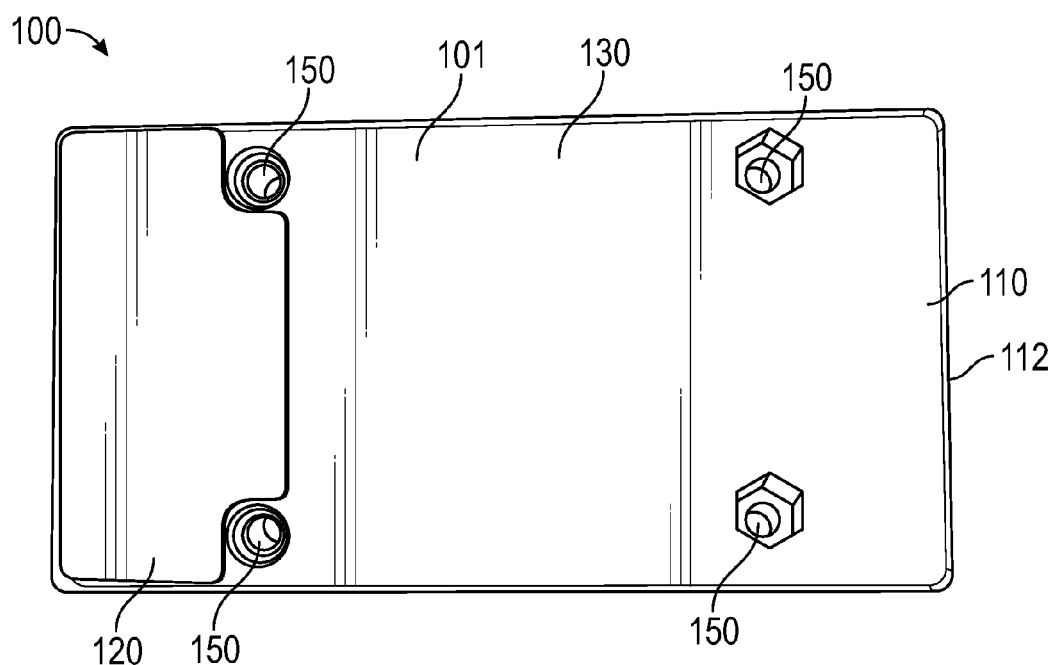
FIG. 3 depicts a bottom view of the device.
Figure 4:
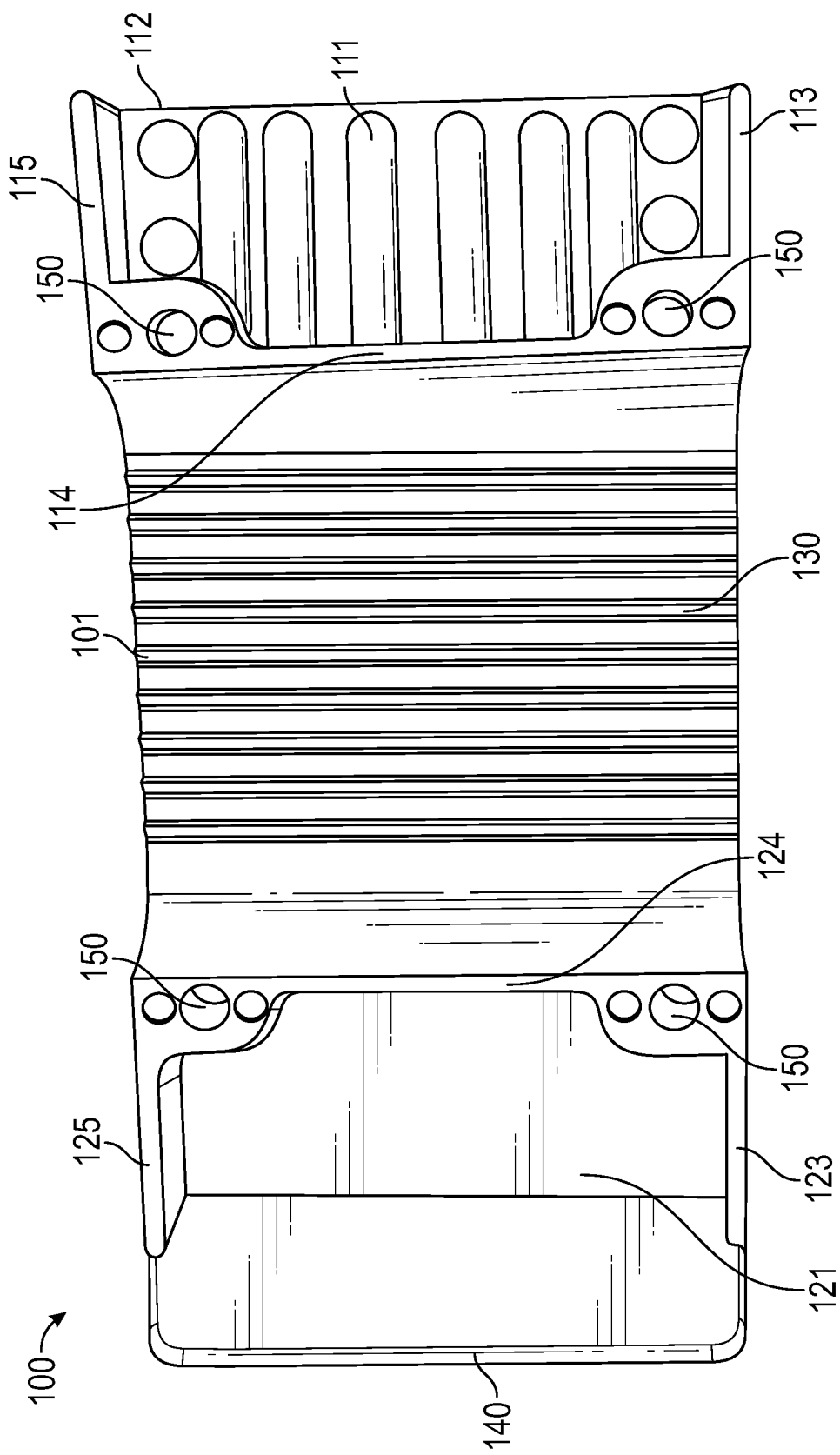
FIG. 4 depicts a top view of the device in which the two opposing ends are not fastened together.
Figure 5:
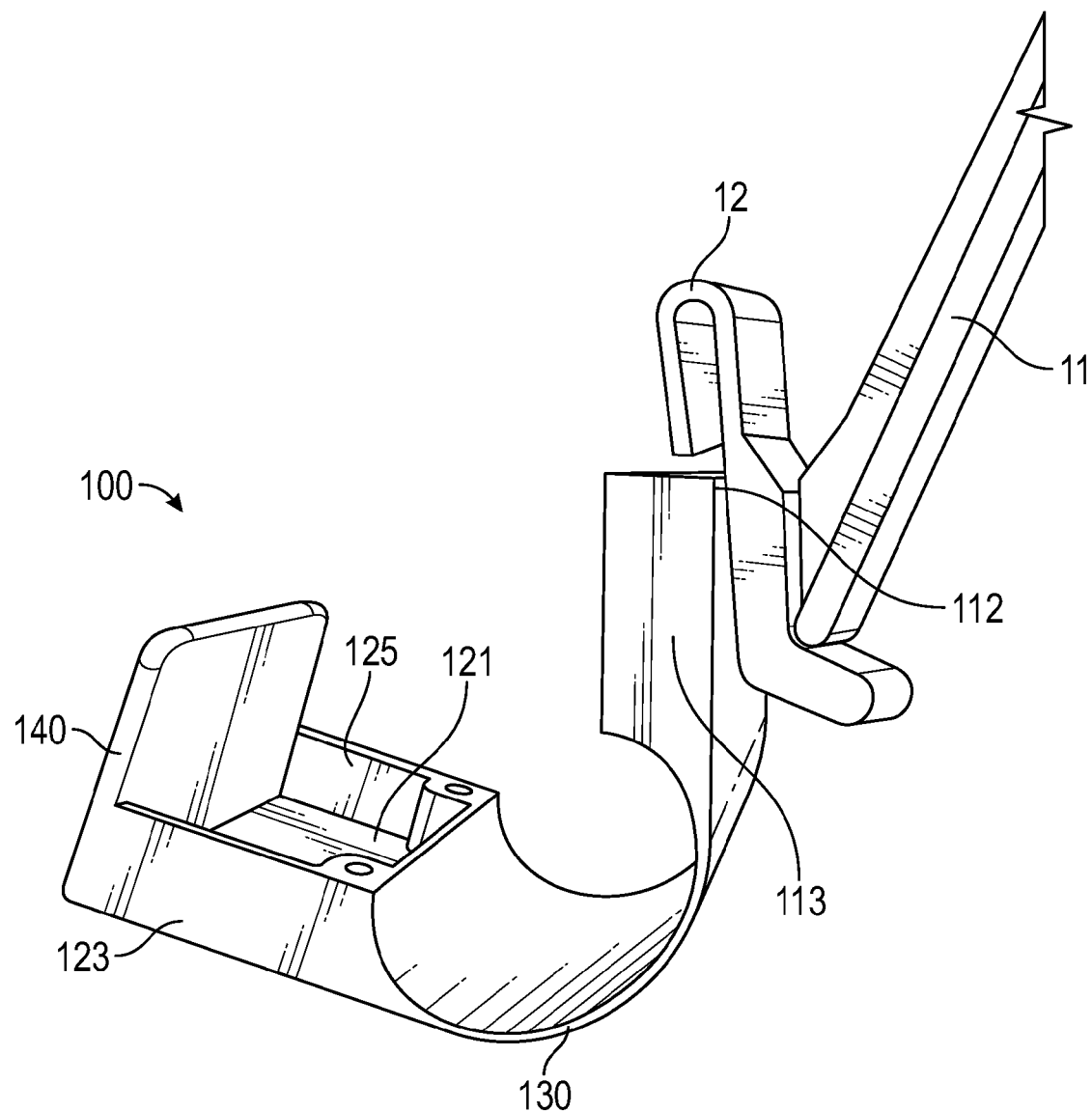
FIG. 5 depicts a side perspective view of a conventional automobile window flag assembly being attached to the device.
Figure 6:
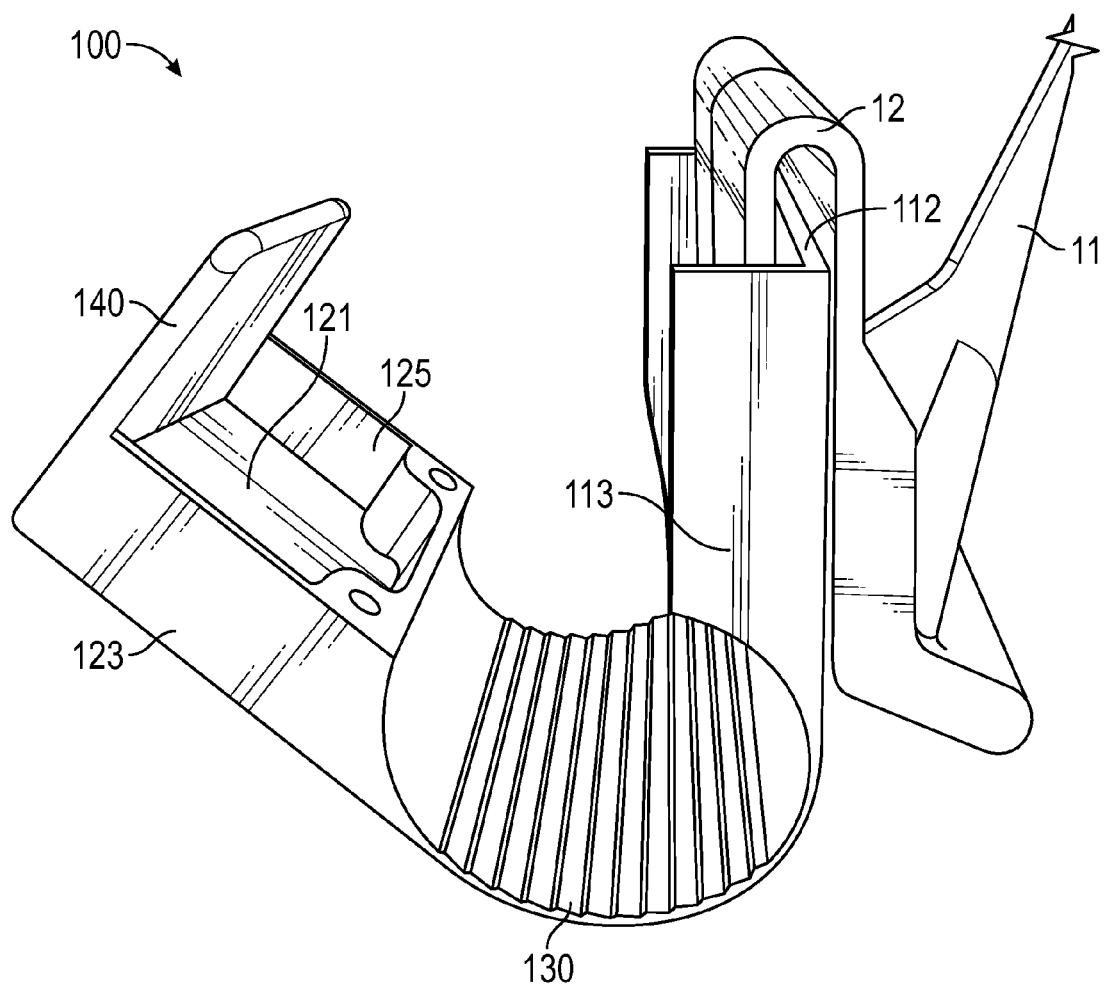
FIG. 6 depicts a side perspective view of the conventional automobile window flag assembly positioned on the device and being advanced on the first opposing end of the device.
Figure 7:
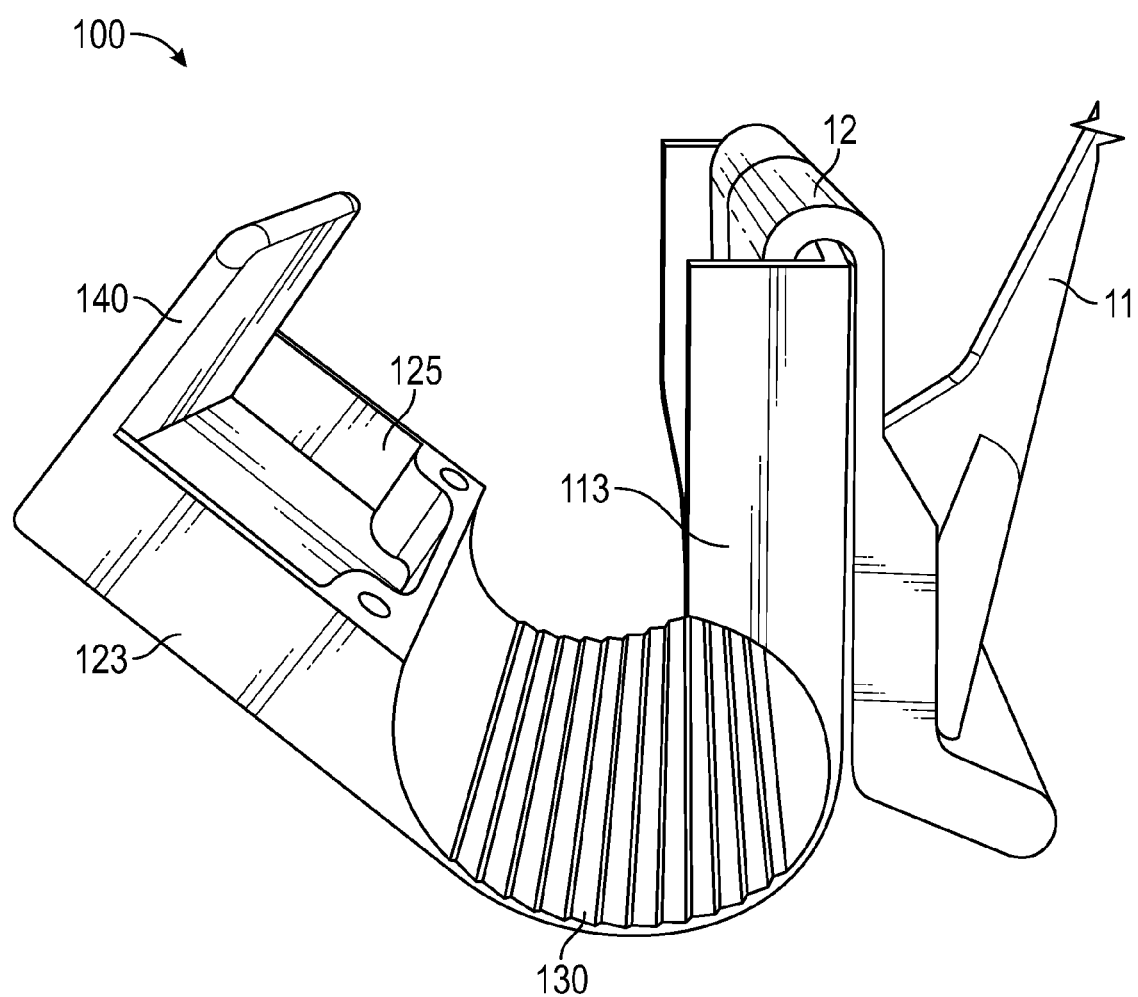
FIG. 7 depicts another side perspective view of the conventional automobile window flag assembly completely positioned on the first opposing end of the device.
Figure 8:
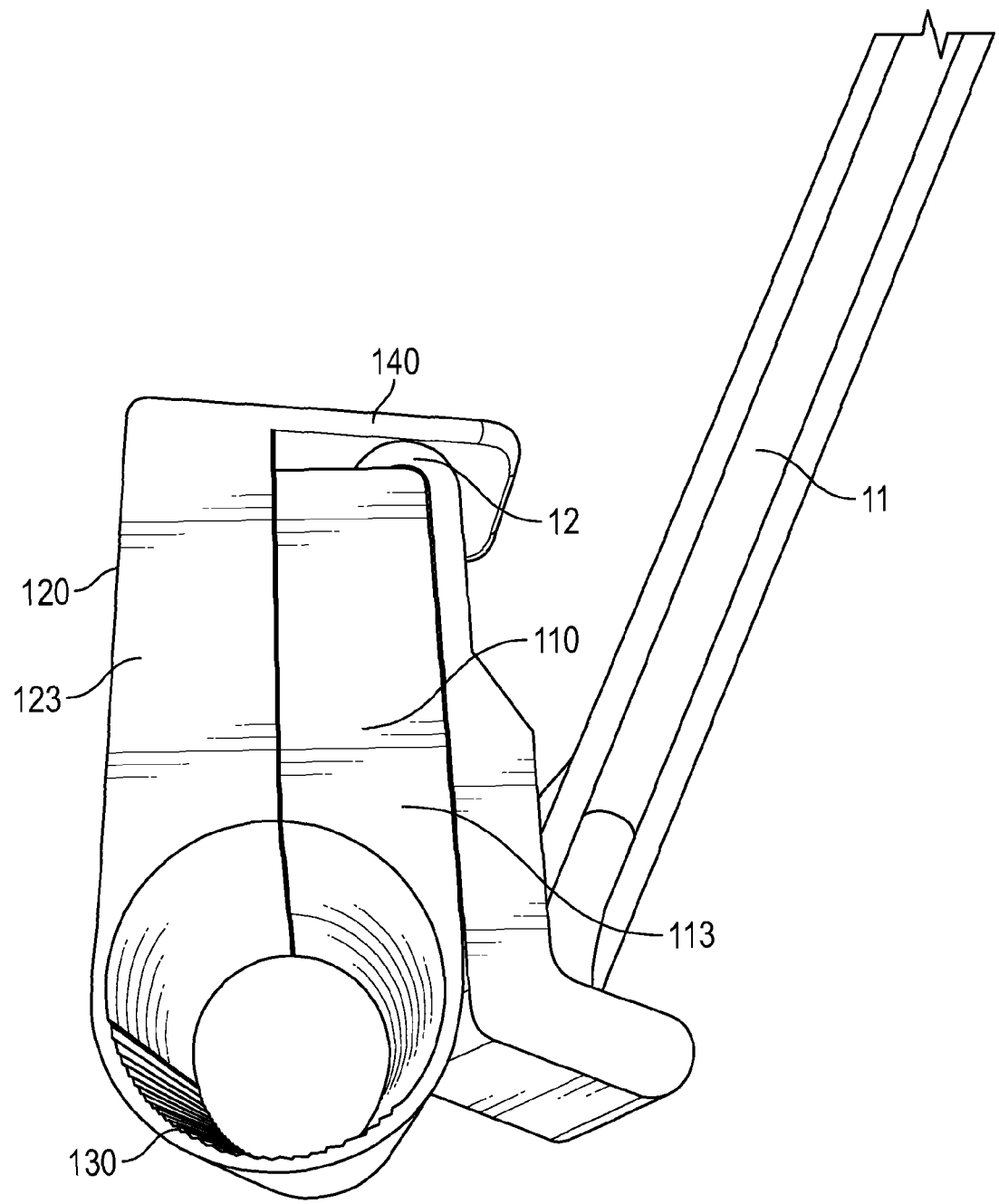
FIG. 8 depicts the first and second opposing ends fastened together with the securing member securing the conventional automobile window flag assembly to the device.
Figure 9:
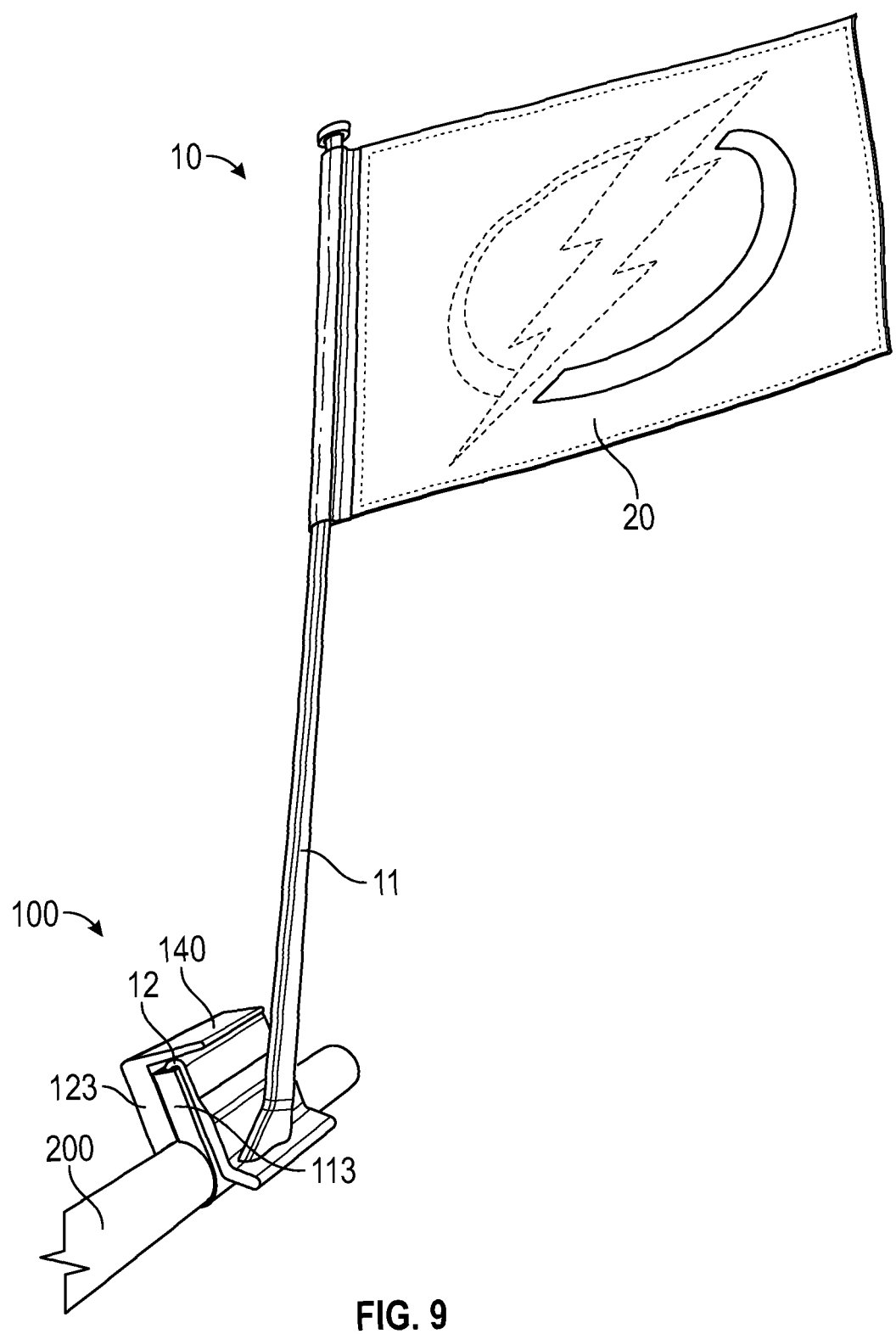
FIG. 9 depicts a perspective view of the conventional automobile window flag assembly secured on the device, the device being attached to a rail and/or pole.

As shown in FIGS. 2-9, and more particularly FIGS. 2 and 4, the device 100 includes a continuous bracket 101 (a unitary body) preferably formed from a thermoplastic resin. The device 100 includes two opposing ends 110, 120 (i.e., a first opposing end 110 and a second opposing end 120 respectively) that are interconnected by a flexible hinge 130 positioned there between. The flexible hinge 130 allows for movement of the device such that the two opposing ends 110, 120 may be coplanar as shown in FIG. 2 (a side view) and FIG. 3 (a corresponding bottom view) when not fastened together. As shown in FIGS. 7-9, the flexible hinge 130 further allows for movement of two opposing ends 110, 120 such that the two opposing ends may be moved towards one another and arranged parallel relative to one another when the two opposing ends are fastened together.

As shown FIGS. 2 and 4, the flexible hinge 130 is tapered in thickness when compared to the two opposing ends 110, 120. The flexible hinge 130 may further include undulating ridges formed throughout the hinge that further aid in movement. The flexible hinge 130 is configured to preferably form predetermined shapes and/or wrap around predetermined shapes. For example, the flexible hinge 130 is preferably configured to have a circular or cylindrical shape when the two opposing ends are fastened to one another. In certain aspects and as shown, for example, in FIG. 9, the flexible hinge 130 is configured to wrap around a cylindrical object 200 (e.g., a pole or rail).

In contrast to the flexible hinge 130 and as shown in FIG. 2, the two opposing ends 110, 120 are thicker and more rigid than the flexible hinge 130 thereby providing stability to the device 100 when the automobile window flag assembly 10 is secured thereon. As further shown in FIGS. 2 and 4, the first opposing end 110 and second opposing end 120 differ from one another. Specifically, the first opposing end 110 is configured to receive and carry window retention member 12 (i.e., a biased slot portion or a biased hook shaped clip) of automobile window assembly 10 thereon while second opposing member has securing member 140 formed thereon in which the securing member is configured to secure the automobile window flag assembly 10 in device 100, as shown, for example, in FIGS. 8 and 9.

As further shown in FIG. 4, the first opposing end 110 includes a first compartment 111 formed by a free end 112 and a plurality of side walls 113, 114, 115 positioned on the first opposing end of the continuous bracket. As alluded to above and as further shown in the sequential views of FIGS. 5-7, window retention member 12 is positioned over free end 112 of the first opposing end 110. The window retention member 12 is subsequently advanced in a downward direction over free end 112 such that window retention member 12 is received in first compartment 111. As further shown in FIGS. 4-7, sidewalls 113 and 115 reduce and/or prevent lateral movement of the window retention member 12 when the window retention member is received in the first compartment 111.

FIG. 4 further depicts the second opposing end 120 including a second compartment 121 formed thereon. The second compartment 121 is formed from a plurality of side walls 123, 124, 125 and from securing member 140 extending perpendicular relative to the second opposing end (e.g. perpendicular relative to the second opposing end along the longitudinal axis of the device when the two opposing ends not fastened together).

As further shown in FIGS. 3, 4, and 7, the two opposing ends 110, 120 each include openings 150 (through holes). These openings are configured to align with a corresponding opening on the opposing end and further allow the two opposing ends 110, 120 to be fastened together through a threaded engagement (e.g., advancing a fastener (screw) through an opening on the first opposing end and subsequently through a corresponding opening of the second opposing end).

After window retention member 12 of automobile window assembly 10 is completely received in the first compartment 111 as shown in FIG. 7, the automobile window assembly 10 may be secured in device 10 as shown, for example, in FIGS. 7 and 8. Specifically, the second opposing end 120 along with securing member 140 is moved towards first opposing end 110 (having window retention member 12 attached thereto). In view of FIGS. 4, 6, and 8, the first compartment 111 of the first opposing end 110 of the continuous bracket, the second compartment 121 of the second opposing end of the continuous bracket 120, and the securing member 140 form an enclosure (cavity) when the two opposing ends of the continuous bracket converge and are fastened to one another. As further shown in FIGS. 8 and 9, when the two opposing ends 110, 120 are fastened to one another, the two opposing ends 110, 120 have a parallel orientation relative to each other with the securing member extending perpendicular relative to each opposing end and extending beyond the first opposing end 110 and window retention member 12. As further shown in FIGS. 8 and 9, only sufficient clearance is present between the securing member 140 and first opposing end 110 of the continuous bracket 101 to secure the slotted portion 12 (window retention member) of the automobile window flag assembly 10 between the securing member 140 and the first opposing end 110 of the continuous bracket. As alluded to above, in certain aspects, openings 150 on the first and second opposing ends are aligned such that the two opposing ends 110, 120 may be fastened together through a threaded engagement (e.g., advancing a screw through an opening on the first opposing end and subsequently through a corresponding opening of the second opposing end).

Each of the assembly components may be formed from thermoplastic resins, metal or metal alloys, or any combination thereof having sufficient strength and durability to endure months or years of outdoor exposure. For example, in certain aspects, assembly components may be formed by injection molding thermoplastic resins.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A device adapted for retrofitting automobile window flag assemblies on surfaces other than automobile windows, the device comprising:
    a continuous bracket having two opposing ends that are interconnected by a flexible hinge positioned there between, wherein:
    the first opposing end of the continuous bracket is configured to receive and carry a slotted portion of the automobile window flag assembly and the second opposing end of the continuous bracket has a securing member formed thereon that is configured to secure the automobile window flag assembly to the device when the two opposing ends of the continuous bracket are fastened to one another, and
    the two opposing ends and flexible hinge are coplanar when the two opposing ends of the continuous bracket are not fastened to one another.

2. A device adapted for retrofitting automobile window flag assemblies on surfaces other than automobile windows, the device comprising:
    a continuous bracket having two opposing ends that are interconnected by a flexible hinge positioned there between, wherein:
    the first opposing end of the continuous bracket is configured to receive and carry a slotted portion of the automobile window flag assembly and the second opposing end of the continuous bracket has a securing member formed thereon that is configured to secure the automobile window flag assembly to the device when the two opposing ends of the continuous bracket are fastened to one another, and
    the two opposing ends are parallel when the two opposing ends of the continuous bracket are fastened to one another and the securing member extends over the first opposing end to secure the slotted portion of the automobile window flag assembly between the securing member and the first opposing end of the continuous bracket.

3. The device of claim 2, wherein the flexible hinge is configured to wrap around and be carried on a cylindrical shaped object when the two opposing ends of the continuous bracket are fastened to one another.

4. The device of claim 3, wherein the first opposing end of the continuous bracket comprises a first compartment formed by a free end and a plurality of side walls positioned on the first opposing end of the continuous bracket, the free end is configured to receive and carry the slotted automobile flag assembly and the plurality of side walls prevent and/or reduce lateral movement of the automobile flag assembly.

5. The device of claim 4, wherein the second opposing end of the continuous bracket comprises a second compartment formed by a plurality of sidewalls in which a first and second sidewall of the plurality of sidewalls are directly connected to the securing member and a third sidewall of the plurality of sidewalls is positioned between first and second sidewall of the plurality of sidewalls and spaced apart from the securing member.

6. The device of claim 5, wherein the first compartment of the first opposing end of the continuous bracket, the second compartment of the second opposing end of the continuous bracket, and the securing member form an enclosure when the two opposing ends of the continuous bracket converge and are fastened to one another such that only clearance is present between the securing member and first opposing end of the continuous bracket to secure the slotted portion of the automobile window flag assembly between the securing member and the first opposing end of the continuous bracket.

7. The device of claim 6, wherein the two opposing ends of the continuous bracket are configured to fasten by a threaded engagement.

8. The device of claim 6, further comprising at least one fastener received through the first and second opposing ends of the continuous bracket to maintain the two opposing ends in a parallel orientation relative to one another.

* * * * *